(12) United States Patent
Hild et al.

(10) Patent No.: US 7,324,108 B2
(45) Date of Patent: Jan. 29, 2008

(54) MONITORING EVENTS IN A COMPUTER NETWORK

(75) Inventors: Stefan G. Hild, Somers, NY (US); Rene Pawlitzek, Kilchberg (CH); Markus Stolze, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 10/798,070

(22) Filed: Mar. 11, 2004

(65) Prior Publication Data

US 2004/0201612 A1 Oct. 14, 2004

(30) Foreign Application Priority Data

Mar. 12, 2003 (EP) .................................. 03405168

(51) Int. Cl.
G06T 11/20 (2006.01)
G09G 5/22 (2006.01)
G06F 7/00 (2006.01)

(52) U.S. Cl. ................ 345/440; 345/440.1; 345/440.2; 345/441; 707/6

(58) Field of Classification Search ..... 345/440–440.1; 707/6
See application file for complete search history.

(56) References Cited

U.S. PATENT DOCUMENTS

| 6,615,211 | B2 * | 9/2003 | Beygelzimer et al. | 707/6 |
| 6,697,791 | B2 * | 2/2004 | Hellerstein et al. | 706/47 |
| 6,697,802 | B2 * | 2/2004 | Ma et al. | 707/6 |
| 6,829,608 | B2 * | 12/2004 | Ma et al. | 707/6 |
| 6,907,426 | B2 * | 6/2005 | Hellerstein et al. | 707/6 |
| 6,996,551 | B2 * | 2/2006 | Hellerstein et al. | 706/48 |
| 2002/0188618 | A1 * | 12/2002 | Ma et al. | |

OTHER PUBLICATIONS

S. Ma, et al., "EventMiner: An integrated mining tool for Scalable Analysis of Event Data", May 21, 2001, www.research.ibm.com.*
Haines et al., "Visualization Techniques for Event Stream Analysis", 1997.*
D. Kranzlmuller, S. Gradbner, J. Volkert, "Event graph visualization for debugging large applications", Proc. of the SIGMETRICS symposium on Parallel and distributed tools, Philadelphia, PA, pp. 108-117.*

* cited by examiner

Primary Examiner—Jin-Cheng Wang
(74) Attorney, Agent, or Firm—Louis P. Herzberg

(57) ABSTRACT

Monitoring events triggered by a computer network. Each event being provided with attribute values allocated to a given set of attributes, and providing an event display, determining a primary attribute and a corresponding display label of the events selected from the given set of attributes presented with attribute values on a cross plot, providing a pattern algorithm to detect whether an arrived event is part of a given pattern, providing a mapping algorithm to map attribute values on the cross plot, allocating a second display label to the events indicating the attributes uncovered as part of the given pattern, plotting events arriving and including an attribute value allocated to a primary attribute into the cross plot, and plotting events arriving within the time period and detected by the pattern algorithm as part of the given pattern into the cross plot with the second display label indicating the given pattern.

14 Claims, 4 Drawing Sheets

MONITORING EVENTS IN A COMPUTER NETWORK

FIELD OF INVENTION

The present invention relates to monitoring events in a computer network. The computer network triggering the events, wherein each event is provided with attribute values allocated to a given set of attributes.

BACKGROUND OF THE INVENTION

With the expansion of the Internet, electronic commerce and distributed computing, the amount of information transmitted via electronic networks is continuously increasing. Such possibilities have opened many new business horizons. However, they have also resulted in a considerable increase of illegal computer intrusions.

An emerging trend that addresses this problem is the development of intrusion detection systems. These systems are aimed to detect attacks on the computer network by monitoring all network activities. Network activities are usually monitored by the intrusion detection system as a time-ordered sequence of events wherein each event is characterized by a given set of attributes, so-called dimensions. Each event therefore forms an n-dimensional space.

The monitoring of a high number of events each having many attributes triggered by an intrusion-detection system is a task that requires high skill and attention from the monitoring staff, since a large fraction of the triggered events is regularly reported. The challenge for an operator of the intrusion detection system is to spot those events that are indicators of a real security problem. In order to distinguish security problem events from "false positive" alarms, the operators of the intrusion detection system usually watches out for interesting event patterns by means of a pattern detection algorithm. This pattern detection algorithm enables to detect whether an arrived event is part of a given pattern on the basis of a comparison of the attributes allocated to this given pattern and the attributes assigned to the arrived event. For example, a pattern detection algorithm may determine whether the events triggered by the intrusion-detection systems all involve the same source IP, i.e. involve the same attacking machine, or the same destination IP, i.e. involve the same attack machine.

In order to render it possible for the operator to supervise the events triggered by the intrusion-detection system a suitable event visualization is needed. Current intrusion event presentation methods can be classified into three different groups: a first group of methods provides the operator of the intrusion detection system with a tabular text display of the relevant event information. For example, the operator console so-called Event Viewer of IBM Tivoli Enterprise Console TEC uses such a presentation method. In order to distinguish "false" positive events from real security problem events, a time-consuming comparison of textual information has to be carried out, making it difficult to spot interesting event patterns.

A second group of prior art event visualization methods provides the operator of the intrusion-detection system with a graphical representation of event information, but does not present the arrival time of the events. This second group method renders it possible to present various relations between event attributes. Such a second group method is known from Erbacher et al., Intrusion and Misuse Detection in Large-Scale Systems, IEEE CGA (2002). This document describes a visualization method representing security events as lines between points, each point representing a specific originating IP address or a specific destination IP address. From Girardin et al., A Visual Approach for Monitoring Logs, Proc. $12^{th}$ Usenix System Administraction Conference, Boston, Mass., USA, 1998, a further second group method is known using a parallel coordinate visualization technique to represent different attributes of events. The disadvantage of the second group methods is that they do not display the event time, which is the most important event attributes. This makes it difficult for operators of the intrusion-detection system to quickly orient themselves if they have not watched the display for a while.

A third group of prior art event monitoring methods enables an event visualization that represents the arrival time of events as a separate event attribute. The arrival time of the event is regularly displayed as the x-axis of cross-plot. From Ma et al., Event Miner: An Integrated Mining Tool for Scalable Analysis of Event Data, May 2002, a visualization method is known using a two-dimensional mapping technique of arbitrary event attributes versa arrival time enabling an operator to analyze the event history. The disadvantage of this method is that only one of the event attributes may be plotted versus the arrival time of the events. Thus, the operators have to switch continuously between the various event attributes to make sure that they do not miss a significant event pattern. From Haines et al., Visualization Techniques for Event Stream Analysis, Eurographics UK Chapter $15^{th}$ Annual Conference, Norwich, 1997, an event visualization technique is known using a vertical stack of cross plots to display multi-event attributes versus event arrival time. This known visualization technique works well if only a few event attributes have to be monitored simultaneously on a screen. A problem may, however, occur if an operator of the intrusion detection system has to supervise a large number of event attributes. He then has to simultaneously watch a large number of different plots each displaying an event attribute versus the event arrival time. In consequence, a high attention of the operator is required to detect all the security problems derivable from the displayed events.

SUMMARY OF THE INVENTION

Therefore, in one aspect the present invention provides methods, apparatus and systems for monitoring events in a computer network enabling an operator of an intrusion-detection system to simultaneously monitor various event attributes versus the arrival time of the events. In an inventive method of monitoring events in a computer network, the computer network triggering the events, each event being provided with attribute values allocated to a given set of attributes includes the steps of providing an event display with a cross plot having two coordinate axes, the x-axis presenting a time period and the y-axis presenting an attribute value range; determining a primary attribute of the events selected from the given set of attributes to be presented with its attribute values on the y-axis of the cross plot, allocating a first display label to the events indicating the attribute values of the primary attribute, providing a pattern algorithm to detect whether an arrived event is part of a given pattern on the basis of a comparison of the attributes allocated to the given pattern and of the attributes assigned to the arrived event, providing a mapping algorithm to map any attribute value of an attribute selected from the given set of attributes onto the y-axis of the cross plot, allocating a second display label to the events indicating the attribute value of the attributes being uncovered as part of the given pattern, plotting all the events arrived within the time period and including an attribute value allocated to a primary attribute into the cross plot with the first display label indicating the primary attribute, the position of the first display label of each event in the cross plot being determined on the basis of the attribute value of the primary attribute of the event and its arrival time, and plotting all the events arrived within the time period and being detected by the pattern algorithm as part of the given pattern into the cross plot with the second display label indicating the given pattern, the position of the second display label of each event in the cross plot being determined by the mapping algorithm on the basis of the attribute value of the attribute of the event as being uncovered as part of the given pattern and its arrival time.

The inventive event visualization method only renders it necessary for an operator of the intrusion-detection system to supervise one single cross plot, which displays all relevant events. The x-axis of the cross plot of the event display indicates the arrival times of the relevant events. The y-axis represents the primary attribute values of the events in which the examiner is mainly interested. Additionally, all the events being detected by the pattern algorithm as part of an interesting event pattern are displayed in the cross plot. In order to differentiate the events associated with the primary attribute from the events being part of the interesting event pattern, a first display label is assigned to all events including a primary attribute value and a second display label is assigned to all events indicating the attribute values of the attributes being uncovered as part of the relevant event pattern. By using the inventive method of monitoring events, the event display presents a plot of information of the main event attribute versus the arrival time of the event by using a first display label for the plotted events wherein the interesting event pattern derived from other event attributes is simultaneously presented by using the second display label for these events. If the operator of the intrusion detection system wants to investigate the events being detected as part of a given pattern in more detail, he can easily switch to the corresponding event attribute by selecting a mark of the second display label in the cross plot.

In an advantageous embodiment, the attribute values and the arrival time of a new event are recorded, on the basis of the recorded attribute values of the event it is determined whether or not the newly arrived event includes an attribute value of the primary attribute and if the newly arrived event includes such an attribute value, the x-axis of the cross plot is shifted so that the time period being presented on the x-axis covers the arrival time of the event so that all events arrived within the shifted time period may be plotted into the cross plot with the first display label indicating their primary attribute values. This performance enables a fast display of the events including the primary attribute.

BRIEF DESCRIPTION OF THE DRAWINGS

The foregoing and other aspects, features and aspects and advantages of the present invention will become more apparent from the following detailed description of the present invention when taken in conjunction with the accompanied drawings, in which.

DETAILED DESCRIPTION OF THE INVENTION

Figure 1:
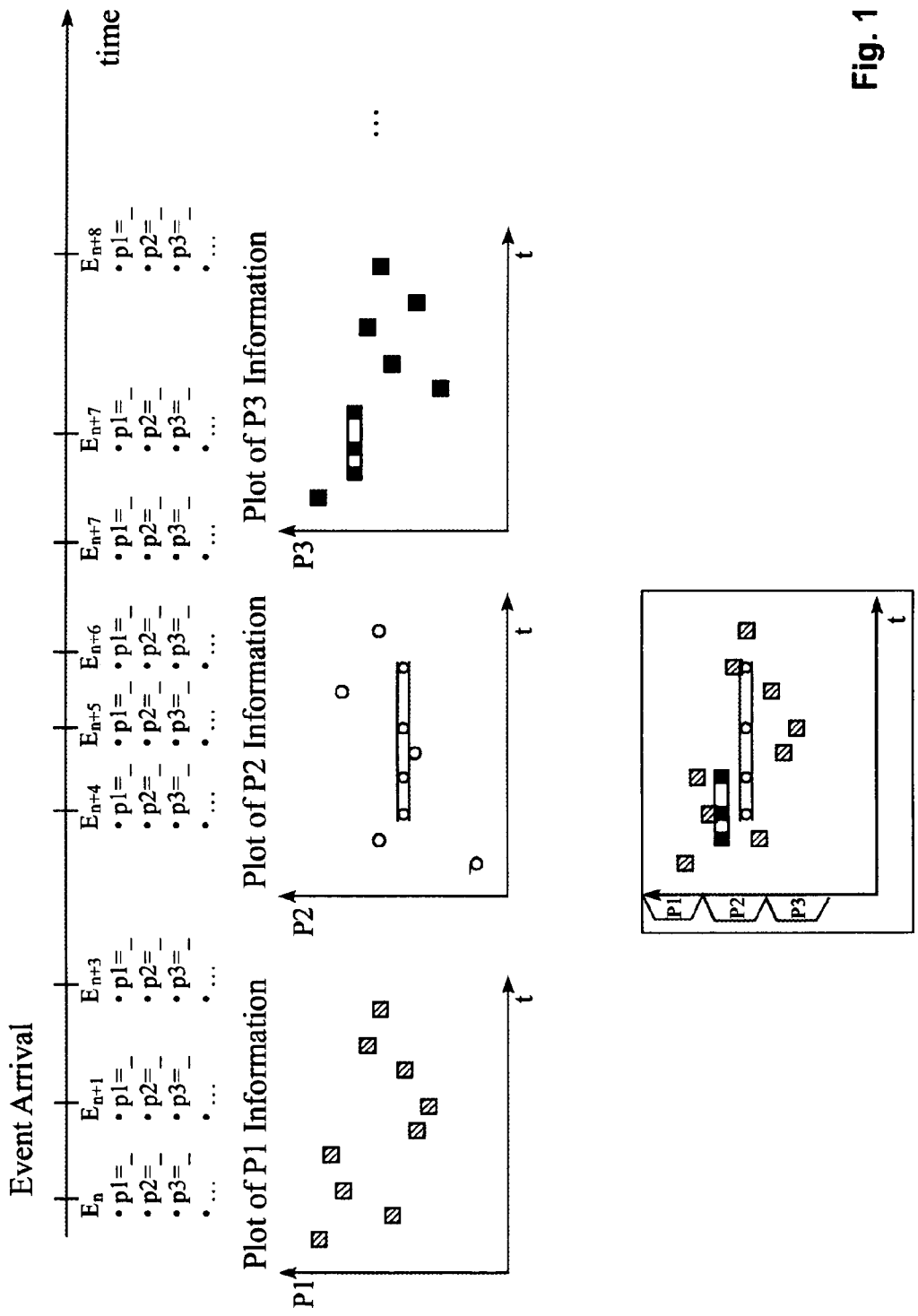
FIG. 1 is a conceptual view on the inventive method of monitoring events in a computer network.

The present invention provides methods, systems and apparatus for monitoring events in a computer network enabling an operator of an intrusion-detection system to simultaneously monitor various event attributes versus the arrival time of the events. Careful logging network activities is essential to meet the requirements of high security and optimal resource availability. However, detecting break-in attempts within the network activities is a difficult task. Making the distinctions between misuse and normal use and identifying intrusions using novel attack techniques is difficult. Although the invention generally deals with an improved visual approach for monitoring events triggered by one or more intrusion detection systems in a computer network, the inventive technique may also be useful for displaying other types of events, not just intrusion events.

The monitoring of events, in particular intrusion events, is a task that requires high skill and attention from the monitoring staff. The reason for this is that a large fraction of the reported events are simply so-called "false" positive alarms. The challenge for the operator is therefore to spot those events that are associated with a real security problem. In order to identify such security events, the operator of the intrusion detection system is on the one hand interested in continuously watching a main characteristic of the incoming events and on the other hand to uncover interesting event patterns. Intrusion detection systems normally generate events provided with attribute values allocated to a given set of attributes to supervise the network activities. These attributes are frequently called dimensions.

In an example embodiment of the inventive method of monitoring events in a computer network, the computer network triggering the events, each event being provided with attribute values allocated to a given set of attributes includes the steps of providing an event display with a cross plot having two coordinate axes, the x-axis presenting a time period and the y-axis presenting an attribute value range, determining a primary attribute of the events selected from the given set of attributes to be presented with its attribute values on the y-axis of the cross plot, allocating a first display label to the events indicating the attribute values of the primary attribute, providing a pattern algorithm to detect whether an arrived event is part of a given pattern on the basis of a comparison of the attributes allocated to the given pattern and of the attributes assigned to the arrived event, providing a mapping algorithm to map any attribute value of an attribute selected from the given set of attributes onto the y-axis of the cross plot, allocating a second display label to the events indicating the attribute value of the attributes being uncovered as part of the given pattern, plotting all the events arrived within the time period and including an attribute value allocated to a primary attribute into the cross plot with the first display label indicating the primary attribute, the position of the first display label of each event in the cross plot being determined on the basis of the attribute value of the primary attribute of the event and its arrival time, and plotting all the events arrived within the time period and being detected by the pattern algorithm as part of the given pattern into the cross plot with the second display label indicating the given pattern, the position of the second display label of each event in the cross plot being determined by the mapping algorithm on the basis of the attribute value of the attribute of the event as being uncovered as part of the given pattern and its arrival time.

An inventive event visualization method only renders it necessary for an operator of the intrusion-detection system to supervise one single cross plot, which displays all relevant events. The x-axis of the cross plot of the event display indicates the arrival times of the relevant events. The y-axis represents the primary attribute values of the events in which the examiner is mainly interested. Additionally, all the events being detected by the pattern algorithm as part of an interesting event pattern are displayed in the cross plot. In order to differentiate the events associated with the primary attribute from the events being part of the interesting event pattern, a first display label is assigned to all events including a primary attribute value and a second display label is assigned to all events indicating the attribute values of the attributes being uncovered as part of the relevant event pattern. By using the inventive method of monitoring events, the event display presents a plot of information of the main event attribute versus the arrival time of the event by using a first display label for the plotted events wherein the interesting event pattern derived from other event attributes is simultaneously presented by using the second display label for these events. If the operator of the intrusion detection system wants to investigate the events being detected as part of a given pattern in more detail, he can easily switch to the corresponding event attribute by selecting a mark of the second display label in the cross plot.

According to an advantageous embodiment, the attribute values and the arrival time of a new event are recorded, on the basis of the recorded attribute values of the event it is determined whether or not the newly arrived event includes an attribute value of the primary attribute and if the newly arrived event includes such an attribute value, the x-axis of the cross plot is shifted so that the time period being presented on the x-axis covers the arrival time of the event so that all events arrived within the shifted time period may be plotted into the cross plot with the first display label indicating their primary attribute values. This performance enables a fast display of the events including the primary attribute.

According to a further advantageous embodiment, it is determined on the basis of a recorded attribute value of a newly arrived event whether or not the newly arrived event is part of the given pattern on the basis of a comparison of the attributes allocated to a given pattern and of the attributes assigned to the arrived event. If the newly arrived event includes an attribute value of the given pattern, the newly arrived event is added to the previous events being detected as part of the given pattern and all the events being associated with the given pattern are redrawn in the cross plot. This technique enables a fast display of the events associated with an interesting event pattern.

Moreover, if a newly arrived event does not include an attribute value of the given pattern it is advantageous to determine on the basis of recorded attribute values of all previous arrived events by means of the pattern algorithm whether or not a newly arrived event is part of a new pattern on the basis of a comparison of the attributes allocated to the new pattern and of the attributes assigned to the arrived events. If the newly arrived event forms a new pattern together with the previously recorded events, a third display label is allocated to the events indicating the attribute values of the attributes being uncovered as part of the new pattern. Then all the events being detected by means of the pattern algorithm as part of the new pattern are plotted into the cross plot with a third display label indicating the new pattern. This technique enables that the event display always presents all event patterns in all attribute dimensions independent from the actually selected dimension.

Moreover, according to another advantageous embodiment, if the an operator wants to change the primary attribute to be displayed on the event display and therefore switches to another event attribute, all the events labels are removed from the cross plot. Then a further display label is allocated to the events indicating the attribute values of the new primary attribute. Finally all the events arrived within the time period presented on the x-axis of the cross plot and including an attribute value of the new primary attribute are plotted into the cross plot with the further display label indicating the new primary attribute. This technique enables the operator a fast change between interesting attributes of events triggered by the computer network.

According to another advantageous embodiment, if the operator selects one of the events, e.g. by moving the cursor near or over the plotted event display label, all the attribute values recorded for this event are plotted into the cross plot with their respective display labels. Moreover, textual information associated with the selected event may be displayed on the event display. This technique enables the operator to quickly obtain all the information necessary to evaluate an interesting event.

According to another advantageous embodiment, the pattern algorithm is suitable to perform multi-attribute pattern recognition so that various interesting event patterns may be simultaneously displayed in the cross plot. In order to improve the visualization of the pattern, it is further advantageous that all the events uncovered as part of the pattern are clustered by a corresponding display label to distinguish the interesting event pattern from other patterns. The presentation of the events is further improved by using display labels for indicating the events in the cross plot including a specific color and/or a specific mark layout.

It is an aspect of present intrusion detection visualization techniques to display event information in such a way that it makes easy for an operator to distinguish false positive events from events belonging to a security problem. The inventive visualization technique, which is detailed below performs a visual fusion of multi-event attributes on a single display. The inventive method improves the state of the art by helping the operator to become aware of all relevant event patterns while looking only at a single monitor screen without the need to cycle around through multiple displays.

According to the invention, events which are triggered in a computer network, each event being provided with values allocated to a given set of dimensions, are monitored with a cross plot having two coordinate axes, the x-axis presenting a time period and the y-axis presenting a selected dimension value range. The operator determines a primary dimension of the events selected from the given set of dimensions to be presented with its dimension values on the y-axis of the cross plot. This primary dimension is associated with a first unique label, advantageously a unique color or a unique mark layout. Moreover, it is advantageous that each dimension of the given set of dimensions is associated with a unique label. Moreover, a pattern algorithm is provided in the event monitoring device to detect whether an arrived event is part of a given pattern on the basis of a comparison of the dimensions allocated to the given event pattern and the dimensions assigned to an arrived event. It is advantageous that the pattern algorithm is able to simultaneously detect a multitude of event patterns. Moreover, the event monitoring device is provided with a mapping algorithm to map any dimension value of a dimension selected from the given set of dimensions onto the dimension value range of the selected primary dimension presented on the y-axis of the cross plot.

The event visualization is performed in that all events arrived within the time period presented on the x-axis of the cross plot and including a dimension value allocated to the primary dimension are plotted into the cross plot with the corresponding display label indicating the primary dimension. The position of the display label of each plotted event is determined on the basis of the corresponding dimension value of the primary dimension of the event and its arrival time. Further, all the events that arrived within the time period presented on the x-axis and being detected by means of a pattern algorithm as part of the given pattern, are also plotted into the cross plot with a unique second display label indicating the given pattern. The second display label indicating the pattern is advantageously an additional mark layout combining all the events corresponding to the pattern in the cross plot. The position of the second display label of pattern events in the cross plot is determined by the mapping algorithm on the basis of the dimension values of the dimensions of the events being uncovered as part of the pattern and their arrival time.

FIG. 1 presents a series of eight events $E_n$ to $E_{n+8}$ being recorded one after the other by the inventive event visualization device. Each event is associated with a set of dimensions p, three dimensions p1 to p3 being indicated. FIG. 1 shows a time vector on which the arrival time of each event $E_n$ to $E_{n+8}$ is marked. Below the time vector, FIG. 1 further shows three cross plots, the x-axis of each cross-plot presenting a time period and the y-axis of each cross-plot presenting a dimension value range for dimensions p1 to p3, respectively. In the first cross plot, all the events arrived within the time period and including a dimension value allocated to the dimension p1 are plotted with a first color. The same applies to all the events including a dimension value allocated to the dimension p2 in the second cross plot and to all the events including a dimension value allocated to the dimension p3 in the third cross plot.

In the embodiment presented in FIG. 1, the operator has determined dimension p1 of the recorded events as the primary dimension. In consequence the pattern algorithm explores whether any of the dimensions p1 to p3, are covered by a given pattern. For example the pattern algorithm examines whether all the events involve the same source IP and the same destination IP. All the events uncovered as part of the given pattern are connected with lines, as shown in the second cross plot and the third cross plot.

All the three cross plots p1 to p3 are finally combined to one single cross plot shown at the bottom of FIG. 1, wherein all the events arrived within the time period and including a dimension value allocated to the primary dimension p1 are plotted with the associated unique color and mark layout. Further, all the events arrived within the time period and being detected by the pattern algorithm as part of the given pattern, are plotted into the cross plot with their unique colors indicating the respective dimensions of the pattern wherein all the events of the pattern are connected with lines.

The inventive method of event visualization enables the operator with a single view onto the x-y coordinate system to monitor all the relevant events occurring in a computer network. The inventive technique provides the possibility that the operator may look at any time at a plot of information dealing with one primary event dimension. These events are plotted with a unique display label. Moreover, all the interesting event patterns of the other dimension plots superimpose this primary dimension plot indicated by their corresponding unique display labels.

Figure 2:
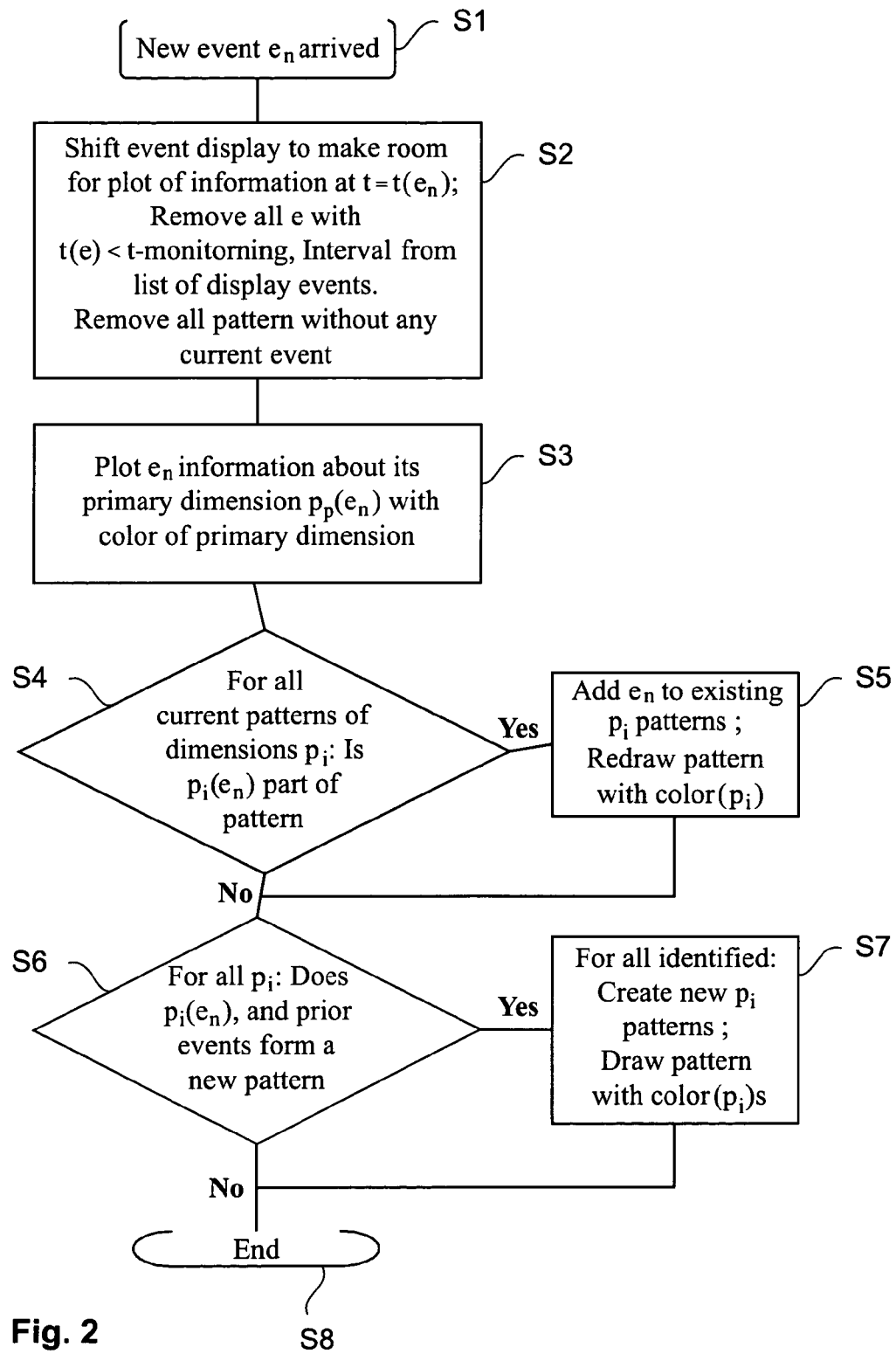
FIG. 2 is an inventive processing flow to display a newly arrived event.

FIG. 2 presents a processing flow for a newly arrived event. If a new event $E_n$ arrives (step S1), the dimension values and arrival time of the newly arrived event are recorded. Furthermore, on the basis of the recorded dimension values, it is determined whether or not the newly arrived event includes a dimension value of the primary dimension. If the newly arrived event includes a dimension value of the primary dimension, in step 2 the event display is shifted to make room for the plot of the newly arrived event, i.e. the x-axis of the event display is shifted so that the time period presented on the x-axis of the plot covers the arrival time of the newly arrived event. Moreover, all the events which are recorded before the new time period presented on the x-axis are removed. This also applies to all the patterns without any current events within the time period presented on the x-axis of the cross plot. In the next step S3, the newly arrived event is plotted into the cross plot with the unique color associated with the primary dimension. Then in step 4, on the basis of the recorded dimension value of all previously arrived events, it is determined by means of the pattern algorithm whether the newly arrived event is part of the given pattern on the basis of a comparison of the dimensions allocated to the given pattern and the dimensions assigned to the newly arrived event. If the newly arrived event includes a dimension value of the given pattern, the event is added in step 5 to the previous events being detected as part of the given pattern and all these events being associated with the given pattern are redrawn in the cross plot.

If the newly arrived event does not include a dimension value of the given pattern, it is determined in step S6 on the basis of the recorded dimension values of the previously arrived events by means of the pattern algorithm whether or not the newly arrived event is part of a new pattern on the basis of a comparison of the dimensions allocated to the new pattern and the dimension values assigned to the arrived event. If the newly arrived event forms a new pattern together with the previously recorded events, all the events detected as part of the new pattern are plotted into the cross plot with their unique colors corresponding to the respective dimensions (step S7). If no new pattern is detected, the program flow is terminated (step S8).

Figure 3:
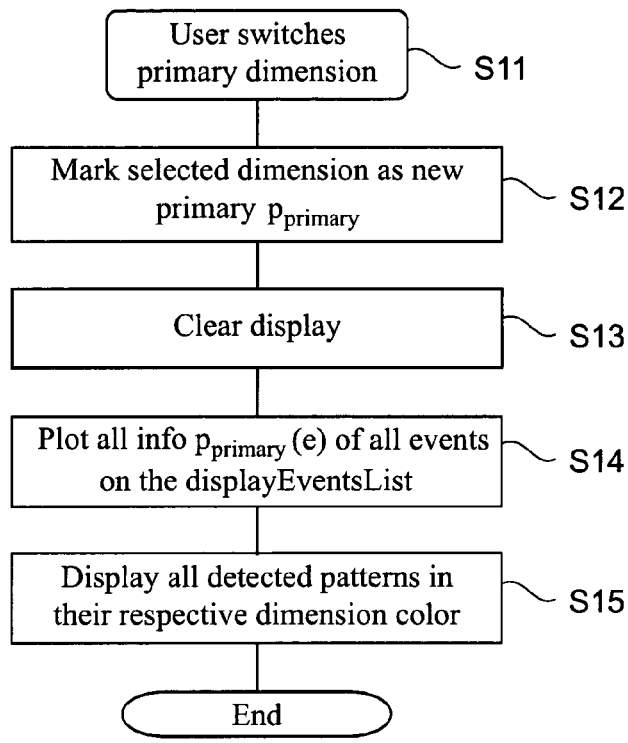
FIG. 3 is a processing flow for a user input to switch the primary attribute of the events to be displayed.

FIG. 3 shows a program flow enabling the operator to change the primary dimension to be displayed. In a first step S11, the operator switches the primary dimension to be displayed. In the next step S12, the new primary dimension is selected. The program then clears the display (step S13) and plots all the events arrived within the time period and including a dimension value allocated to the new primary dimension into the cross plot with a corresponding display label indicating the new primary dimension (step S14). Then, all the detected patterns are also plotted into the cross plot (step S15).

Figure 4:
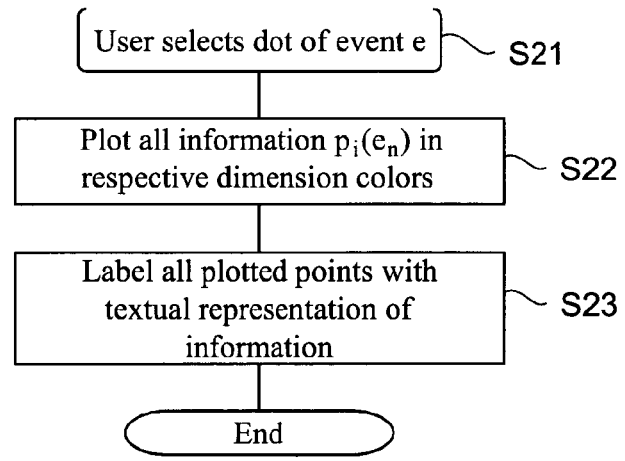
FIG. 4 is a processing flow for a user input to select a specific event to be displayed in detail.

If the operator intends to investigate the context of the pattern in more detail, a program flow may take place as shown in FIG. 4. The operator may move the cursor to a plotted dot in the display and selected this dot (step S21). In the next step S22, the program plots all the dimension information into the cross plot corresponding to the selected event. Further, a full picture of the event is displayed in a further step S23 by presenting a textual representation of all the event properties. The textual representation of the event properties can be provided either in a separate window or by labeling all the displayed event dots. The step S23 may be triggered separately by the operator, for example, with a further push of a mouse key, when the cursor controlled by the mouse is located at the plotted dot. It is possible that the operator may select multiple events, for example, by shift clicking.

Figure 5:
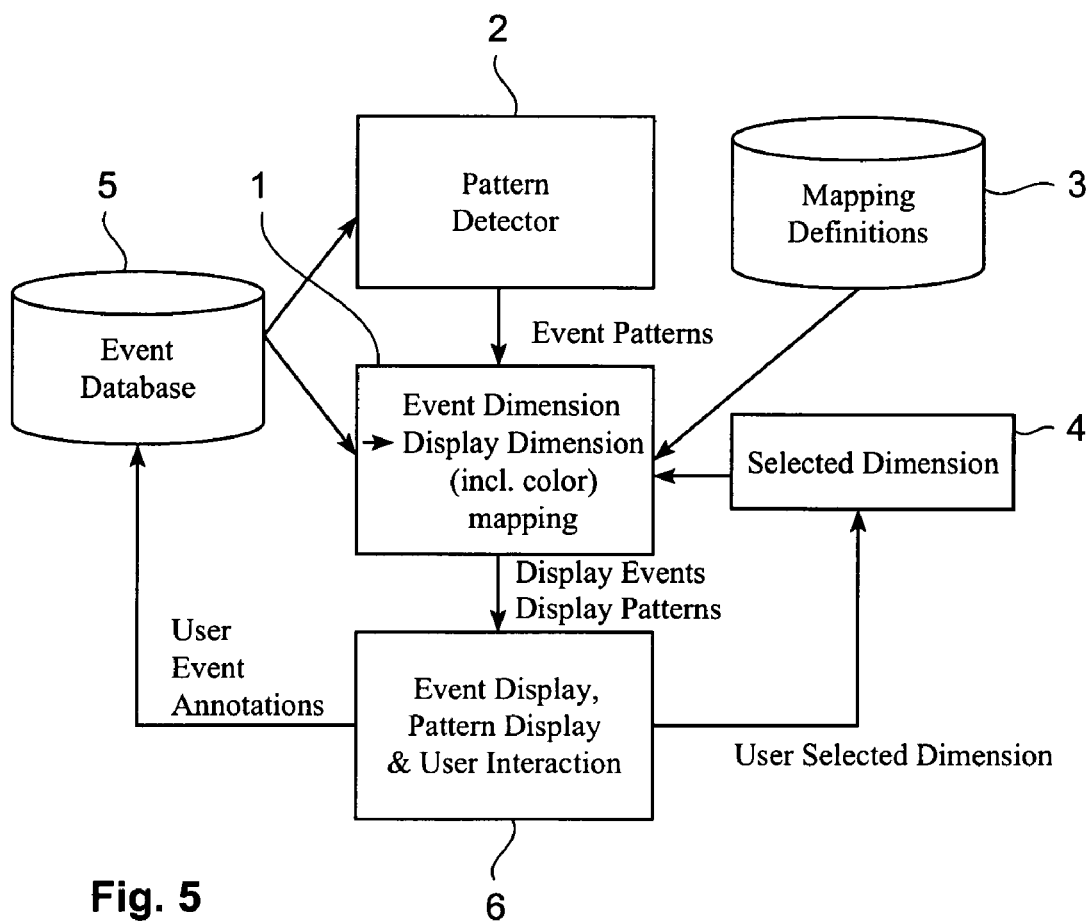
FIG. 5 is a data-flow diagram disclosing the functional components involved in generating the inventive event visualization.

FIG. 5 shows a data flow diagram presenting the functional components involved in the inventive event visualization technique. The central device 1 is the event dimension/display mapping component. The central device 1 takes the following information as an input: Information on detected event patterns from a pattern detector 2. Further, mapping definition information as input from a corresponding mapping database 3. This information specifies a function for each event dimension that maps any event dimension value into a value range of the y-axis of the corresponding event display x-y coordinate system. In order to carry out this mapping performance, the mapping definition information specifies a family of functions m with individual functions $m_{dimension}$: $domain_{dimension}$ −>Z. Further, the central device 1 receives information on the current selected primary event dimension 4 to be displayed and information on the current event from the event database 5. The event database 5 is also connected to the pattern detector 2. On the basis of the input information, the central device 1 determines the events and the patterns to be displayed and output the data to be displayed to the event and pattern display 6. The event and pattern display 6 enables an interaction with the operator, the operator interaction may affect the event database 5 and/or the selected dimension 4.

FIG. 1 of the present application shows as an example a linear pattern, i.e. all dots are located on a single row which is detected by the pattern algorithm and visualized. However, also more complex dimension patterns can be detected by the pattern detection algorithm and be displayed in a similar manner, as shown in FIG. 1. To present a complex pattern, the display technique may highlight the involved event dots and possibly connect them with a polygon line to emphasize the pattern. The inventive method not only performs "within dimension" patterns, but also may use an algorithm to detect multi-dimension patterns. The pattern detection algorithm might further use background information such as the operating system, vulnerabilities of the attacked machine as well as other information gathered from a network security scan. It is also possible to integrate such event background information as additional displayable event dimensions.

A problem with plotting information on multi-dimensions into a single cross plot may be that the dots can be clustered and occlude each other. To reduce such a clustering of the displayed dimensions, it may be possible to assign a unique y-position to each dimension.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method comprising monitoring network activities as a time-ordered sequence of events in a computer network, each event having attributes triggered by an intrusion-detection system, each event being characterized by a given set of attributes called dimensions, each event forming an n-dimensional space, the step of monitoring comprising:

said computer network triggering said events, each event being provided with attribute values allocated to a given set of attributes of said each event, each attribute having a particular attribute value, simultaneously monitoring each particular attribute value of various event attributes from said given set of attributes versus the arrival time of said each event, providing an event display with a cross plot having x and y coordinate axes, the x-axis presenting a time period and the y-axis presenting an attribute value range, and visualizing data along said x and y coordinate axes, said axes being attribute axes, determining a primary attribute of said each event, said primary attribute being selected from the given set of attributes, each said primary attribute of said each event to be presented with a corresponding attribute value on the y-axis of the cross plot, allocating a first display label to the events indicating the attribute value of the primary attribute of each event, providing a pattern algorithm to detect whether an arrived event is part of the given pattern on the basis of a comparison of the attributes allocated to the given pattern and of the attributes assigned to the arrived event, providing a mapping algorithm to map any attribute value of an attribute selected from the given set of attributes onto the y-axis of the cross plot, allocating a second display label to said each event indicating the attribute values of the attributes being uncovered as part of the given pattern, plotting all events that arrived within the time period and including an attribute value allocated to the primary attribute into the cross plot with the first display label indicating the primary attribute, the position of the first display label of said each event in the cross plot being determined on the basis of the attribute value of the primary attribute of the event and its arrival time, plotting all events that arrived within the time period and being detected by means of the pattern algorithm as part of the given pattern into the cross plot with the second display label indicating the given pattern, the position of the second display label of said each event in the cross plot being determined by the mapping algorithm on the basis of the attribute value of the attribute of the event being uncovered as part of the given pattern and its arrival time, viewing a secondary attribute of said each event together with the primary attribute on said display.

2. The method according to claim 1, further comprising:
recording the attribute values and the arrival time of a new event, determining on the basis of the recorded attribute values of event whether or not the newly arrived event includes an attribute value of the primary attribute, and if the newly arrived event includes the attribute value for the primary attribute shifting the x-axis of the cross plot so that the time period being presented on the x-axis covers the arrival time of the event, and plotting the event arrived within the shifted time period into the cross plot with the first display label indicating the primary attribute.

3. The method according to claim 2 comprising the farther steps of:
determining on the basis of the recorded attribute values of event whether or not the newly arrived event is part of the given pattern on the basis of a comparison of the attributes allocated to the given pattern and of the attributes assigned to the arrived event, if the newly arrived event includes an attribute value of the given pattern adding the event to the previous events being detected as part of the given pattern, and redrawing all the events being associated with given pattern in the cross plot.

4. The method according to claim 3, further comprising:
if the newly arrived event does not include an attribute value of the given pattern, determining on the basis of the recorded attribute values of all previous arrived events by means of the pattern algorithm whether or not the newly arrived event is part of a new pattern on the basis of a comparison of the attributes allocated to the new pattern and of the attributes assigned to the arrived events;

if the newly arrived event forms together with previous recorded events the new pattern, allocating a third display label to the events indicating the attribute values of the attributes being uncovered as part of the new pattern; and plotting the all events being detected by means of the pattern algorithm as part of the new pattern into the cross plot with the third display label indicating the new pattern, the position of the third display label of said each event in the cross plot being determined by the mapping algorithm on the basis of the attribute value of the attribute of the event being uncovered as part of the new pattern and its arrival time.

5. The method according to claim 1, further comprising:
removing all the events including an attribute value allocated to the primary attribute from the cross plot, if a primary attribute to be presented with its attribute values on the y-axis of the cross plot is changed, allocating a fourth display label to the events indicating the attribute values of the new primary attribute, and plotting all the events arrived within the time period and including an attribute value allocated to the new primary attribute into the cross plot with the fourth display label indicating the new primary attribute, the position of the fourth display label of said each event in the cross plot being determined on the basis of the attribute value of the primary attribute of the event and its arrival time.

6. The method according to claim 1 comprising the farther steps of plotting all attribute values recorded for an event with the respective display label into the cross plot if the event is selected by an operator, and displaying textual information associated with the selected event on the event display.

7. The method according to claim 1, wherein the pattern algorithm is suitable to perform multi-attribute pattern recognition.

8. The method according to claim 1, wherein each display label includes a specific color and/or a specific mark layout.

9. The method according to claim 1, wherein all events being uncovered as part of the pattern are clustered by the corresponding display label.

10. The method of claim 1, further comprising employing a tangible computer readable medium comprising program code being computer executable instructions to cause the carrying out the steps of triggering, monitoring, providing, determining, allocating a first display label, allocating a second display label, plotting events including an attribute value, plotting events detected, viewing, and automatically generating, when the program code is running on a computer.

11. The method according to claim 1, further comprising:
recording the attribute values and the arrival time of a new event, determining on the basis of the recorded attribute values of event whether or not the newly arrived event includes an attribute value of the primary attribute, and if the newly arrived event includes the attribute value for the primary attribute shifting the x-axis of the cross plot so that the time period being presented on the x-axis covers the arrival time of the event, plotting the event arrived within the shifted time period into the cross plot with the first display label indicating the primary attribute;

determining on the basis of the recorded attribute values of event whether or not the newly arrived event is part of the given pattern on the basis of a comparison of the attributes allocated to the given pattern and of the attributes assigned to the arrived event;

if the newly arrived event includes an attribute value of the given pattern adding the event to the previous events being detected as part of the given pattern;

redrawing all the events being associated with given pattern in the cross plot;

if the newly arrived event does not include an attribute value of the given pattern, determining on the basis of the recorded attribute values of all previous arrived events by means of the pattern algorithm whether or not the newly arrived event is part of a new pattern on the basis of a comparison of the attributes allocated to the new pattern and of the attributes assigned to the arrived events;

if the newly arrived event forms together with previous recorded events the new pattern, allocating a third display label to the events indicating the attribute values of the attributes being uncovered as part of the new pattern; and plotting the all events being detected by means of the pattern algorithm as part of the new pattern into the cross plot with the third display label indicating the new pattern, the position of the third display label of event in the cross plot being determined by the mapping algorithm on the basis of the attribute value of the attribute of the event being uncovered as part of the new pattern and its arrival time.

12. The method according to claim 11, further comprising:

removing all the events including an attribute value allocated to the primary attribute from the cross plot, if a primary attribute to be presented with its attribute values on the y-axis of the cross plot is changed, allocating a fourth display label to the events indicating the attribute values of the new primary attribute, and plotting all the events arrived within the time period and including an attribute value allocated to the new primary attribute into the cross plot with the fourth display label indicating the new primary attribute, the position of the fourth display label of each event in the cross plot being determined on the basis of the attribute value of the primary attribute of the event and its arrival time.

13. A program storage device being a computer readable medium, tangibly embodying a program of instructions executable by a computer to perform method steps for monitoring network activities as a time-ordered sequence of events in a computer network, each event having attributes triggered by an intrusion-detection system, each event being characterized by a given set of attributes called dimensions, each event forming an n-dimensional space, said step of monitoring comprising the steps of:

said computer network triggering said events, each event being provided with attribute values allocated to a given set of attributes of said each event, each attribute having a particular attribute value, simultaneously monitoring each particular attribute value of various event attributes from said given set of attributes versus the arrival time of said each event, providing an event display with a cross plot having x and y coordinate axes, the x-axis presenting a time period and the y-axis presenting an attribute value range, and visualizing data along said x and y coordinate axes, said axes being attribute axes, determining a primary attribute of said each event selected from the given set of attributes, each said primary attribute of said each event to be presented with a corresponding attribute value on the y-axis of the cross plot, allocating a first display label to the events indicating the attribute value of the primary attribute of each event providing a pattern algorithm to detect whether an arrived event is part of the given pattern on the basis of a comparison of the attributes allocated to the given pattern and of the attributes assigned to the arrived event, providing a mapping algorithm to map any attribute value of an attribute selected from the given set of attributes onto the y-axis of the cross plot, allocating a second display label to said each event indicating the attribute values of the attributes being uncovered as part of the given pattern, plotting all events that arrived within the time period and including an attribute value allocated to the primary attribute into the cross plot with the first display label indicating the primary attribute, the position of the first display label of said each event in the cross plot being determined on the basis of the attribute value of the primary attribute of the event and its arrival time, plotting all events that arrived within the time period and being detected by means of the pattern algorithm as part of the given pattern into the cross plot with the second display label indicating the given pattern, the position of the second display label of said each event in the cross plot being determined by the mapping algorithm on the basis of the attribute value of the attribute of the event being uncovered as part of the given pattern and its arrival time, and viewing a secondary attribute of said each event together with the primary attribute on said display.

14. An article of manufacture comprising apparatus for monitoring events in a computer network, the apparatus comprising:

said computer network having means for intrusion-detection triggering said events, each event having attributes triggered by the means for intrusion-detection, each event being characterized by a given set of attributes called dimensions, each event forming an n-dimensional space, each event being provided with attribute values allocated to a given set of attributes of said each event, means for simultaneously monitoring various event attributes from said given set of attributes versus the arrival time of said each event, means for providing an event display with a cross plot having x and y coordinate axes, the x-axis presenting a time period and the y-axis presenting an attribute value range, and visualizing data along said x and y coordinate axes, said axes being attribute axes, means for determining a primary attribute of said each event, said primary attribute being selected from the given set of attributes, each said primary attribute of said each event to be presented with a corresponding attribute value on the y-axis of the cross plot, means for allocating a first display label to the events indicating the attribute value of the primary attribute of each event, providing a pattern algorithm to detect whether an arrived event is part of the given pattern on the basis of a comparison of the attributes allocated to the given pattern and of the attributes assigned to the arrived event, providing a mapping algorithm to map any attribute value of an attribute selected from the given set of attributes onto the y-axis of the cross plot, means for allocating a second display label to said each event indicating the attribute values of the attributes being uncovered as part of the given pattern, means for plotting all events that arrived within the time period and including an attribute value allocated to the primary attribute into the cross plot with the first display label indicating the primary attribute, the position of the first display label of said each event in the cross plot being determined on the basis of the attribute value of the primary attribute of the event and its arrival time, means for plotting all events that arrived within the time period and being detected by means of the pattern algorithm as part of the given pattern into the cross plot with the second display label indicating the given pattern, the position of the second display label of said each event in the cross plot being determined by the mapping algorithm on the basis of the attribute value of the attribute of the event being uncovered as part of the given pattern and its arrival time, and means for viewing a secondary attribute of said each event together with the primary attribute on said display.

* * * * *